Dec. 29, 1953
H. KONET ET AL
2,664,558
INDICATING DEVICE
Filed Aug. 7, 1950
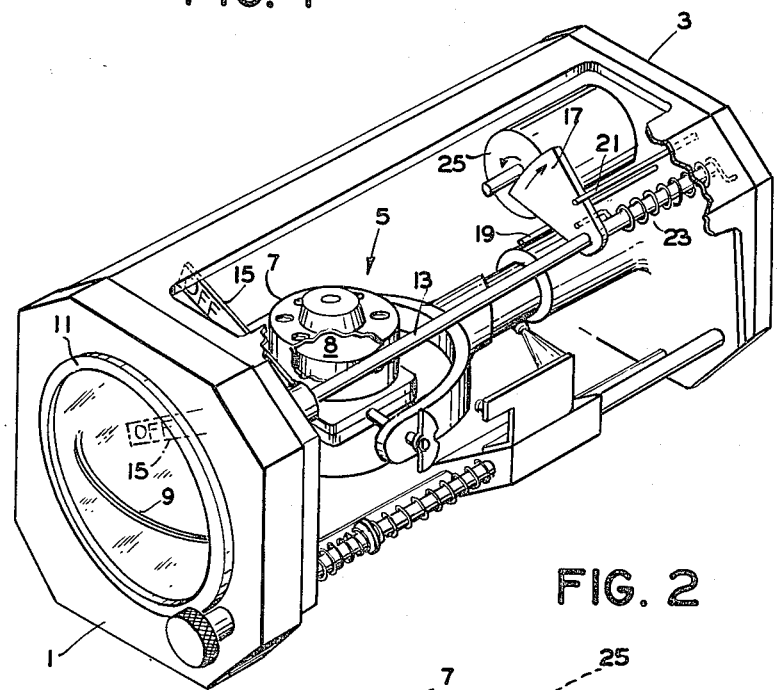
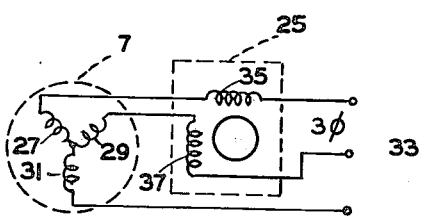
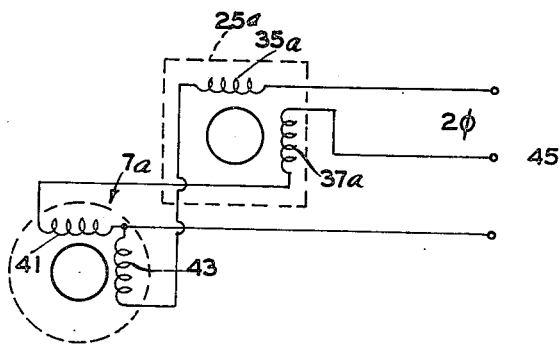
INVENTORS
*HENRY KONET*
*PAUL E. SEIFRIED*
BY
ATTORNEY Patented Dec. 29, 1953

2,664,558

UNITED STATES PATENT OFFICE 2,664,558

INDICATING DEVICE

Henry Konet, Hohokus, N. J., and Paul E. Seifried, New City, N. Y., assignors to Bendix Aviation Corporation, Teterboro, N. J., a corporation of Delaware Application August 7, 1950, Serial No. 177,996

9 Claims. (Cl. 340—253)

The invention relates to indicating devices for electrical apparatus, and more particularly to a device for indicating improper or interrupted current flow.

One object of the present invention is to provide a novel power failure indicator especially adapted for a polyphase system for indicating interrupted or improper current flow or a fault in any one of the phases of the system.

Another object is to indicate phase reversal of the current source relative to the instrument.

The invention contemplates providing torque means, such as a two-phase motor, drivably connected to a flag-like indicator and electrically connected in series with two of the phases of a polyphase system. When the system is operating normally, current flows through the torque means and moves the indicator from an "off" position to another position to indicate normal operation of the system. Should the current flow in the system be interrupted intentionally or otherwise, or be unsuitable for proper operation of the system, the indicator is moved to "off" position. Likewise, the indicator is moved to "off" position when the instrument in which the indicator is used is connected to the source in reverse phase.

The foregoing and other objects and advantages of the invention will appear more fully hereinafter from a consideration of the detailed description which follows, taken together with the accompanying drawing wherein two embodiments of the invention are illustrated. It is to be expressly understood, however, that the drawing is for the purposes of illustration and description only, and is not to be construed as defining the limits of the invention.

In the drawing,

Figure 1 is a perspective view of a novel power failure indicator constructed according to the invention and embodied in a gyro horizon indicator having a three-phase motor for driving the rotor.

Figure 2 is a schematic wiring diagram showing the electrical connections for the three-phase system of Figure 1.

Figure 3 is a schematic wiring diagram showing the electrical connections for a two-phase system.

Referring now to the drawing for a more detailed description of the novel power failure indicator of the present invention, the power failure indicator is shown in Figure 1 as incorporated in a gyro horizon indicator having a housing with a front wall 1 and a rear wall 3. A gyro vertical 5 having a three-phase motor 7 for driving a rotor 8 is mounted within the housing. A horizon indicator bar 9 is visible through a window 11 in wall 1 and is controlled by the gyro vertical and indicates the attitude of the craft in which the gyro horizon indicator is mounted.

An elongated shaft 13 is rotatably supported by walls 1 and 3 and mounts a flag 15 movable between an "off" position shown in dot-dash lines in Figure 1, in which the flag is visible through window 11, and an "on" position shown in solid lines, in which the flag is hidden from view behind the front wall. A sector gear 17 is fixed to shaft 13 and engages stops 19, 21 fixed to rear wall 3 to limit rotation of shaft 13 to an angle of approximately thirty (30) degrees. A spring 23, encircling shaft 13, has one end attached to rear wall 3 and its other end attached to sector gear 17 and yieldingly urges sector gear 17 into engagement with stop 19. A two-phase torque motor 25 is secured to rear wall 3, and, when energized, drives sector gear 17 into engagement with stop 21.

As shown in Figure 2, gyro motor 7 has its windings 27, 29, 31 connected to a three-phase power source 33. Windings 35, 37 of torque motor 25 are connected in series with windings 27, 29 of gyro motor 7. When the gyro motor is energized, current flows through windings 35, 37 of the torque motor and the motor drives sector gear 17 into engagement with stop 21 and moves flag 15 from the view of the observer behind wall 1. When no current flows through gyro motor 7, spring 23 urges sector gear 21 into engagement with stop 19 and moves flag 15 to a position in which the flag is visible to the observer through window 11.

In Figure 3, a power failure indicator constructed according to the invention is incorporated in a two-phase system. Motor 7a has its phase windings 41, 43 connected to a two-phase power source 45. Windings 35a, 37a of torque motor 25a are connected in series with windings 41, 43 of motor 7a. When motor 7a is energized, current flows through windings 35a, 37a of the torque motor and causes the motor to rotate and move a flag or other indicator to "on" position. When no current flows through motor 7a, a spring (not shown) may be used to urge the flag to "off" position.

With the arrangements described, if any one leg of the system is open, inside or outside of the instrument, so that current cannot flow through that leg, the torque motor will not be energized and the indicator will indicate power-off condition. If a dead short occurs in the gyro motor, the torque motor will be connected directly across the power source and will burn out and give a power-off indication. Also, should the voltage of the power source be below normal and insufficient to energize the torque motor, the indicator will give a power-off indication. If the phase rotation of the current source be reversed relative to the instrument, the indicator will move to "off" position.

Although the device has been incorporated in a gyro horizon indicator to indicate abnormal or interrupted power conditions resulting in inoperativeness or abnormal operation of the gyro horizon indicator, it should be understood that the power failure indicator may be used in any polyphase system and will indicate interrupted or improper current flow, reversed phase rotation of a fault in any one of the phases of the system.

Although but two embodiments of the invention have been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. In a device of the kind described for indicating a fault in a polyphase electrical system, torque means connected in series with at least two of the phases of the system, and a single warning indicator movable by said torque means from one position to another when current flows normally in the system.

2. In a device of the kind described for indicating a fault in a polyphase electrical system, torque means connected in series with at least two of the phases of the system, and a single warning indicator movable by said torque means from one position to another when current flows normally in the system, and means to move said warning indicator to said one position when current flow in the system is improper or interrupted.

3. In a device of the kind described for indicating a fault in an electrical system including apparatus having polyphase connections and adapted to be energized by a polyphase source, a multi-phase torque motor having its phase windings connected in series with at least two of the phase connections of the apparatus, and a warning indicator driven from one position to another by said motor when current flows normally in the system.

4. In a device of the kind described for indicating a fault in an electrical system including apparatus having polyphase connections and adapted to be energized by a polyphase source, a two-phase torque motor having its phase windings connected in series with two of the phase connections of the apparatus, a warning indicator driven from one position to another by said motor when current flows normally in the system, and resilient means urging said warning indicator to said one position and maintaining said warning indicator in said one position during improper or interrupted current flow in the system.

5. In a device of the kind described for indicating a fault in an electrical system including apparatus having polyphase connections adapted to be energized by a polyphase source, a two-phase torque motor having its phase windings connected in series with two of the phase connections of the apparatus, a sector gear rotatable between limits and driven by said torque motor, a warning indicator moved by said sector gear from one position to another as determined by said limits when current flows normally in the system, and resilient means urging said sector gear toward said one limit and maintaining said warning indicator in said one position during improper or interrupted current flow in the system.

6. In a device of the kind described for indicating a fault in an electrical system including apparatus having three-phase connections and adapted to be energized by a three-phase source, a two-phase torque motor having its phase windings connected in series with two of the phase connections of the apparatus, and a warning indicator driven from one position to another by said motor when current flows normally in the system.

7. In a device of the kind described for indicating a fault in an electrical system including apparatus having three-phase connections and adapted to be energized by a three-phase source, a two-phase torque motor having its phase windings connected in series with two of the phase connections of the apparatus, a warning indicator driven from one position to another by said motor when current flows normally in the system, and means to return said warning indicator to said one position during improper or interrupted current flow in the system.

8. In a device of the kind described for indicating a fault in a two-phase electrical system, a two-phase torque motor connected in series with the phases of the system, and a warning indicator driven by said torque motor from one position to another when current flows normally in the system.

9. In a device of the kind described for indicating a fault in a two-phase electrical system, a two-phase torque motor connected in series with the phases of the system, a warning indicator driven by said torque motor from one position to another when current flows normally in the system, and means to urge said warning indicator to said one position when current flow in the system is improper or interrupted.

HENRY KONET.
PAUL E. SEIFRIED.

References Cited in the file of this patent

UNITED STATES PATENTS

| Number | Name | Date |
|---|---|---|
| 1,141,119 | Kaisling | June 1, 1915 |
| 1,527,932 | Sperry | Feb. 24, 1925 |
| 1,960,848 | Jones | May 29, 1934 |
| 2,354,902 | Wolferz | Aug. 1, 1944 |
| 2,422,067 | Bechberger | June 10, 1947 |
| 2,430,782 | Poole | Nov. 11, 1947 |